United States Patent [19]

Schneider

[11] 4,332,100
[45] Jun. 1, 1982

[54] FLYING INSECT TRAP
[75] Inventor: William A. Schneider, Lancaster, Pa.
[73] Assignee: Pestolite, Inc., Lancaster, Pa.
[21] Appl. No.: 229,723
[22] Filed: Jan. 28, 1981

Related U.S. Application Data

[63] Continuation of Ser. No. 76,735, Sep. 18, 1979, abandoned.
[51] Int. Cl.³ .............................................. A01M 1/08
[52] U.S. Cl. .................:........................ 43/113; 43/139
[58] Field of Search ........................... 43/113, 133, 139

[56] References Cited

U.S. PATENT DOCUMENTS

| 2,883,790 | 4/1959 | Blackman | 43/113 |
| 3,305,965 | 2/1967 | Coinell | 43/113 X |
| 3,336,694 | 8/1967 | O'Connell | 43/113 X |
| 3,348,332 | 10/1967 | O'Connell | 43/113 |
| 3,987,578 | 10/1967 | Ruett | 43/113 X |
| 4,117,624 | 10/1978 | Phillips | 43/113 |
| 4,127,961 | 12/1978 | Phillips | 43/113 X |
| 4,157,629 | 6/1979 | Parks | 43/113 |

FOREIGN PATENT DOCUMENTS 665247 8/1935 Fed. Rep. of Germany ........ 43/139

Primary Examiner—James G. Smith
Assistant Examiner—Robert P. Olszewski
Attorney, Agent, or Firm—Martin Fruitman

[57] ABSTRACT

An attractive, compact, insect trapping appliance which uses a horizontal ultraviolet light to attract insects and a cylindrical air flow pattern forcing the insects into a water filled tray where they are trapped. The water trap permits easy, sanitary disposal with no special trapping element to replace. The water surface also acts as an air filter, cleaning pollen, dust and other airborne pollutants from the circulating air, and preventing fouling of the fan mechanism.

9 Claims, 2 Drawing Figures

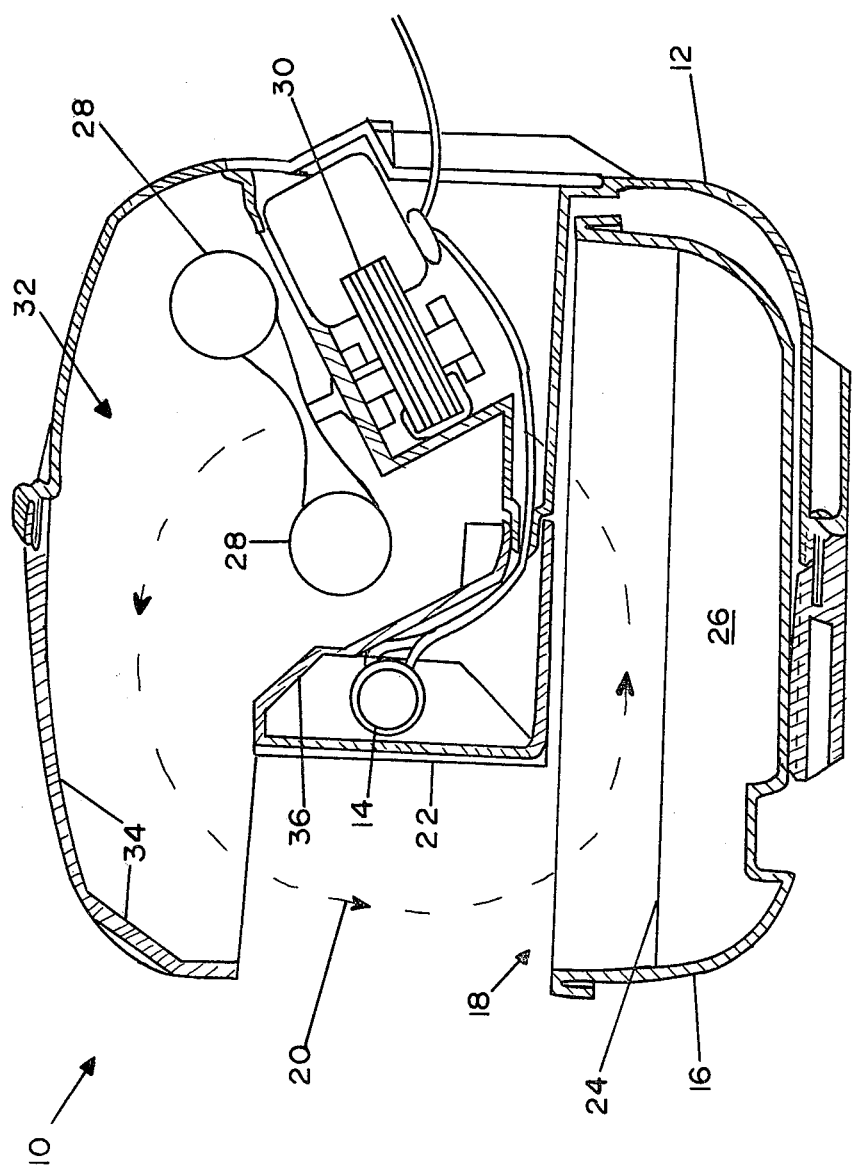

FLYING INSECT TRAP

This is a continuation, of application Ser. No. 76,735 filed Sept. 18, 1979, now abandoned.

BACKGROUND OF THE INVENTION

The present invention relates generally to insect traps and more specifically to a trap which uses ultraviolet radiation to attract insects and a moving air stream to force them into the trap.

Of the many types of flying insect traps available in the patent art and commercially, only those without toxic chemicals are safe enough and aesthetically attractive enough to be generally acceptable for indoor use. The devices designed for indoor use have generally involved an ultraviolet lamp for attracting the insects and a trapping or electrocution element to capture or kill the insects.

Various trapping elements have been included in patented devices. U.S. Pat. No. 3,336,694 uses an air curtain to force the insects into a container where they remain alive. U.S. Pat. No. 4,117,624 traps the insects by means of a passive reflector with a sticky coating in proximity to the lamp and U.S. Pat. No. 4,127,961 uses the air stream principal to force the insects in contact with a sticky surfaced container. U.S. Pat. No. 3,348,332 uses a narrow throated passage to direct falling insects injured by over exposure to the ultraviolet radiation into a liquid wetted reservoir which completes their entrapment.

All these prior art devices have one or both of the problems which are most distasteful to the typical user. Those without blowers invariably cause an accumulation of flying insects around the ultraviolet source until the random flight patterns bring them in contact with the trap or cause over exposure to the ultraviolet radiation. Those with sticky traps require the unpleasant task of disposing of the trap and replacing it with a new sticky surface. This not only involves frequent sensory contact with well preserved insects, some of which are still alive and struggling, but also requires the cost and logistics of maintaining a supply of new trapping elements.

SUMMARY OF THE INVENTION

The present invention eliminates the problems of an accumulation of insects around the lamp, disposal of an insect loaded sticky element, and the cost and supply of new trapping elements by using combined air stream and liquid trapping with a large enough quantity of liquid to eliminate frequent change of liquid. Moreover, the air flow path which diverts insects into the liquid is specifically designed to maximize the portion of the air path across the liquid surface to yield a filter action, by not only trapping insects, but also other airborne pollutants such as dust and vapors. This prevents fouling of the fan and eliminates the frequent cleansing required of other such appliances.

The configuration of the present invention which yields these benefits is one which develops an air flow pattern that approximates the flow around the surface of a horizontal cylinder, with the radiation source at the approximate axis of the cylinder, and includes a liquid reservoir at the lowermost point of the cylinder. The air flow path is therefore minimized, and the insects are exposed to the liquid surface over approximately one-quarter of the total air flow path, thus assuring a high trapping efficiency. The horizontal configuration includes a high volume liquid reservoir approximately as long as the light source. This permits changing liquid at far greater intervals than previous devices which stored all trapped insects on the surface. When detergent is added to water for use as the trapping liquid, few insects remain afloat and the storage capacity of the device is commensurate with the surface area and depth of the liquid, not merely the surface area. Therefore, the present invention surpasses all previous devices by an order of magnitude in regard to storage capability.

The lamp itself, along with the reflector behind it, which effectively concentrates the radiation output in the direction for which insect protection is desired, is isolated from actual contact by insects with a flat transparent shield. While the flat shield is far easier to clean than the combination of lamp and reflector, accumulation of insects is largely prevented by the constant non-turbulent air flow across the front of the shield.

The present invention thereby furnishes a highly efficient, low maintenance, completely safe and attractive unit for trapping flying insects either outdoors or inside buildings.

BRIEF DESCRIPTION OF THE DRAWINGS

FIG. 2 is a cross sectional view of the preferred embodiment taken in a plane perpendicular to the axis of the radiation source at the approximate midpoint of the radiation source.

DETAILED DESCRIPTION OF THE INVENTION

Figure 1:
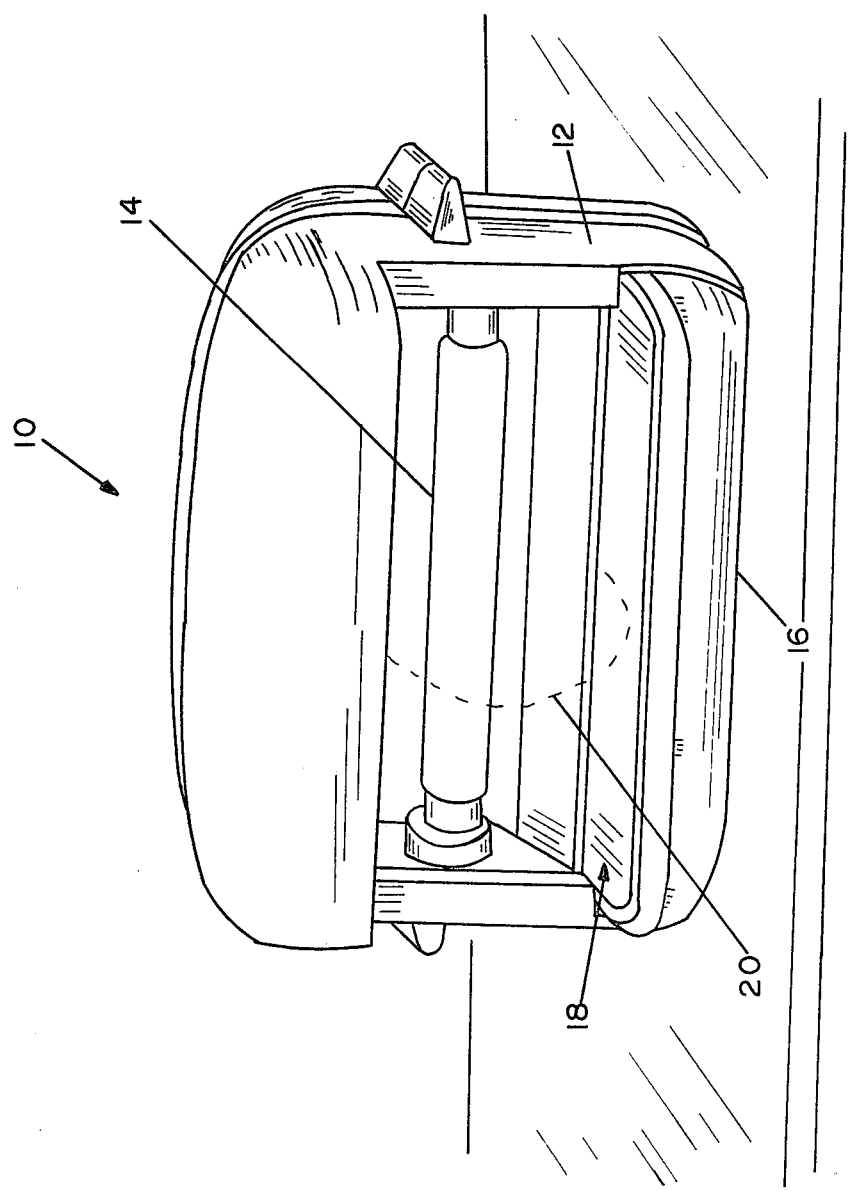
FIG. 1 is a perspective view of the preferred embodiment of the invention.

The preferred embodiment of the invention is shown in FIG. 1 where an insect trap 10 is shown in perspective view as it sits on a horizontal surface.

Frame 12 holds ultraviolet radiation lamp 14, and liquid reservoir tray 16 with open top 18 slides into the bottom of frame 12, so that an airstream is directed as represented by typical path 20 in a generally cylindrical configuration around ultraviolet lamp 14 and into tray 16.

As shown more clearly in FIG. 2, a cross-sectioned view perpendicular to the axis of lamp 14 at its approximate midpoint, air path 20 flows across the front surface 22 of transparent shield 22 mounted in front of lamp 14. After flowing down across the area in front of lamp 14, the air moves generally horizontally across liquid surface 24.

It is during the change of direction of air flow at this point that insects attracted to lamp 14 and trapped in the air stream fall into liquid 26. Plain water with a few drops of household diswashing detergent functions very suitably as liquid 26. Such a mixture, being non-toxic and easily available, is highly desirable, and the detergent causes the insects to be wetted and generally sink to the bottom of the reservoir. The water depth, which is preferably over one inch, is then capable of storing a considerable quantity of insects wihtout necessitating frequent emptying of tray 16.

As the air stream moves across liquid surface 24, aided by the action of gravity, it also discharges most other particulates, such as pollen, dust and smoke, and this cleansing action generally aids in maintaining fan blade 28 and fan motor 30 clean and trouble free.

The uppermost area 32 of frame 12 is generally shaped with angular surfaces 34 to direct and deflect air stream 20 into a vertically downward path in the front of shield 22.

Shield 22 functions to assure non-turbulent airflow in front of lamp 14 to better divert insects into the liquid and also protects lamp 14 and reflector 36 from fouling by insects. The single, flat front surface of shield 22, not only accumulates far fewer insects because of the constant "wash" by the air stream, but is very easy to clean when dirtied by insects.

The horizontal tubular configuration of lamp 14 is particularly necessary to the operation of the invention because it increases the liquid surface available to trap the insects and uses gravity as a trapping aid. The horizontal configuration also bodes well for longer lamp life since vertical lamps tend to fail at the lower lamp filament. Higher wattage radiation sources with increased length may be used to increase the trapping surface available and can be accommodated by simply using a greater number of fans along the lamp length. In such a configuration each fan would be oriented in the same manner as fan blades 28, but would be positioned at a different point along the axis of lamp 14.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For example, radiation sources other than ultraviolet lamps and liquids other than water, although possibly not as efficient or suitable, can also be used within the scope of the invention.

What is claimed as new and desired to be secured by Letters Patent of the United States is:

1. A trap for flying insects comprising:
   a frame;
   a radiation source of tubular cylindrical configuration mounted within and held by the frame in an orientation such that the axis of the radiation source is essentially horizontal;
   air circulating means attached to and mounted within the frame and oriented so that all of the air flowing into it is moved across the surface of a liquid contained within a reservoir within the frame prior to entry into the air circulating means, to remove particulate matter from the air;
   air flow directing means attached within the frame and shaped to direct an air flow generated by the air circulating means in a recirculating non-turbulent flow pattern within the frame and around the radiation source so that the flow pattern approximates a horizontal cylinder coaxial to the radiation source;
   said reservoir having a dimension parallel to the axis of the radiation source which approximates the axial length of the radiation source, removably mounted within the frame so that the top of the reservoir is located in proximity to and tangent with the lowest portion of the air flow path; and
   said liquid contained in the reservoir to trap insects diverted onto the liquid surface by the air flow generated by the air circulating means.

2. A trap for flying insects as in claim 1 wherein the radiation source is an ultraviolet light.

3. A trap for flying insects as in claim 1 wherein the liquid is water.

4. A trap for flying insects as in claim 1 wherein the liquid depth is maintained at at least one inch.

5. A trap for flying insects as in claim 1 wherein the liquid reservoir is slideably mounted within the frame.

6. A trap for flying insects as in claim 1 which further comprises a transparent shield attached to the frame and located in front of the radiation source, forming a barrier between the air flow and the radiation source and preventing fouling of the radiation source by insects.

7. A trap for flying insects as in claim 6 wherein the shield is a vertical flat surface.

8. In a flying insect trap having a frame holding a radiation source for attracting insects and an air moving means attached to the frame for diverting approaching insects into a reservoir removably attached to the frame and containing liquid which entraps the insects, the improvement wherein: the radiation source is of tubular cylindrical configuration mounted within and held by the frame in an orientation such that the axis of the radiation source is essentially horizontal; an air flow directing means is attached within the frame and shaped to direct the air flow generated by the air moving means into a recirculating nonturbulent flow pattern within the frame and around the radiation source approximating a horizontal cylinder coaxial to the radiation source; the reservoir is located in proximity to and tangent with the lowest portion of the cylindrical non-turbulent air flow pattern with the dimension of the reservoir which is parallel to the axis of the radiation source approximating the axial length of the radiation source; and the air moving means is enclosed within the insect trap and oriented so that all of the air flowing into the air moving means is moved across the surface of the liquid in the reservoir prior to entry into the air moving means, to remove particulate matter from the air.

9. The improved flying insect trap of claim 8 further including a continuous transparent shield attached to the frame and located in front of the radiation source, forming a barrier between the air flow and the radiation source, designed to prevent fouling of the radiation source with insects by facilitating non-turbulant air flow across the front surface of the shield.

* * * * *